US012078329B2

(12) United States Patent
Dahan

(10) Patent No.: US 12,078,329 B2
(45) Date of Patent: Sep. 3, 2024

(54) FOUR HEAD SPOT LIGHT

(71) Applicant: LES PRODUITS SUNFORCE INC., Montréal-Ouest (CA)

(72) Inventor: Michael Dahan, Hampstead (CA)

(73) Assignee: LES PRODUITS SUNFORCE INC., Montreal-Ouest (CA)

( * ) Notice: Subject to any disclaimer, the term of this patent is extended or adjusted under 35 U.S.C. 154(b) by 0 days.

(21) Appl. No.: 18/143,832

(22) Filed: May 5, 2023

(65) Prior Publication Data

US 2023/0358391 A1 Nov. 9, 2023

Related U.S. Application Data

(60) Provisional application No. 63/338,537, filed on May 5, 2022.

(51) Int. Cl.

| | |
|---|---|
| ***F21V 21/26*** | (2006.01) |
| ***F21S 8/00*** | (2006.01) |
| ***F21V 21/30*** | (2006.01) |
| ***F21V 23/04*** | (2006.01) |

(52) U.S. Cl.

CPC .............. *F21V 21/26* (2013.01); *F21S 8/033* (2013.01); *F21V 21/30* (2013.01); *F21V 23/0442* (2013.01)

(58) Field of Classification Search

CPC ........... F21S 8/033; F21S 8/036; F21V 21/26; F21V 21/30; F21V 14/02

See application file for complete search history.

(56) References Cited

U.S. PATENT DOCUMENTS

| | | | | |
|---|---|---|---|---|
| 4,488,209 A * | 12/1984 | Gosswiller | B60Q 7/00 362/272 |
| 4,952,157 A | 8/1990 | Hudson et al. | |
| 6,146,191 A | 11/2000 | Kerr, Jr. et al. | |
| 6,290,377 B1 * | 9/2001 | Hulse | B60Q 1/2657 52/118 |
| 6,322,234 B1 | 11/2001 | Drake et al. | |
| 6,502,975 B1 | 1/2003 | Branstetter | |
| 6,780,049 B1 | 8/2004 | D'Angelo et al. | |
| 2001/0033487 A1 | 10/2001 | Crelin | |
| 2003/0148649 A1 | 8/2003 | Kerr | |
| 2003/0161160 A1 | 8/2003 | Caluori | |
| 2012/0002427 A1 | 1/2012 | Moon et al. | |

(Continued)

FOREIGN PATENT DOCUMENTS

| | | |
|---|---|---|
| CN | 201892069 | 7/2011 |
| CN | 103486501 | 1/2014 |

(Continued)

*Primary Examiner* — Alexander K Garlen

(74) *Attorney, Agent, or Firm* — Benoit & Cote Inc.; Charles-Andre Caron

(57) ABSTRACT

A spotlight may include a mounting module for mounting the spotlight to a support surface about a mounting interface; and an axle mounted to the mounting module distant from the mounting interface. A first lighting module is rotatably mounted to the axle, with the first lighting module comprising a first directable light emitter; and a second lighting module is pivotably mounted to the axle, with the second lighting module comprising a second directable light emitter. The spotlight may comprise four lighting modules, and a sensor module, wherein the wing lighting modules and the sensor module may be redirected horizontally and vertically.

20 Claims, 7 Drawing Sheets

(56) References Cited

U.S. PATENT DOCUMENTS

| | | | | |
|---|---|---|---|---|
| 2012/0182748 | A1 | 7/2012 | McCaslin et al. | |
| 2012/0287616 | A1 | 11/2012 | Wilcox | |
| 2013/0292149 | A1 | 11/2013 | Cooper et al. | |
| 2014/0268775 | A1 * | 9/2014 | Kennemer | F21V 21/145 362/369 |
| 2014/0368838 | A1 | 12/2014 | Tassakos et al. | |
| 2017/0184293 | A1 * | 6/2017 | Chen | F21V 23/0471 |
| 2017/0311740 | A1 | 11/2017 | Leroux | |
| 2017/0314741 | A1 | 11/2017 | Gleeson et al. | |
| 2018/0156427 | A1 * | 6/2018 | Bailey | F21V 23/001 |
| 2018/0195703 | A1 * | 7/2018 | Bailey | F21V 17/02 |
| 2019/0212003 | A1 * | 7/2019 | Lazear | F21V 21/30 |
| 2021/0274619 | A1 * | 9/2021 | Bailey | H05B 47/17 |

FOREIGN PATENT DOCUMENTS

| | | | | |
|---|---|---|---|---|
| CN | 209294980 | U * | 8/2019 | |
| DE | 102013112792 | A1 * | 6/2015 | F21V 15/01 |
| DE | 202018106507 | U1 * | 1/2019 | F21S 2/00 |
| EP | 3346182 | A1 * | 7/2018 | F21S 8/086 |
| FR | 2949535 | | 1/2014 | |
| JP | 3056129 | | 6/2000 | |
| JP | 2012025075 | | 2/2012 | |
| JP | 2015125976 | | 7/2015 | |

* cited by examiner

FOUR HEAD SPOT LIGHT

CROSS-REFERENCE TO RELATED APPLICATION

This application clams priority or benefit from U.S. provisional patent application No. 63/338,537, filed May 5, 2022, the specification of which is hereby incorporated herein by reference in its entirety.

BACKGROUND

(a) Field

The subject matter disclosed generally relates to lights and fixtures. More particularly, the subject matter disclosed relates to wall-mounted light fixtures.

(b) Related Prior Art

In the field of light fixtures, and particularly wall-mounted light fixtures and ceiling-mounted light fixtures, there has been developments over the years to provide more useful light fixtures by removing their requirement to be connected to the electric grid. Improvements were made in the power source, the lightbox mounting solutions, the lightbox controls and other aspects related thereto.

Some light fixtures comprise motion sensors to controllably light up an area when movement is detected. The locations where these light fixtures are to be mounted and the area they work in, vary greatly. Nowadays, users must mount the light fixture, not based on the desired location of the light fixture, but almost solely based on the location to be lit up by the light beams generated by the light fixture.

There is therefore a need for improvement in exterior light fixtures. It is further a need to improve the light fixture generating light beams and their capacity of orienting the light beams to light up selected areas.

SUMMARY

In some aspects, the techniques described herein relate to a spotlight including: a mounting module configured to be mounted to a support surface, the mounting module including a common axle distant from the support surface, the common axle featuring a rotating interface and a spinnable interface relative to a lighting module horizontal rotation axis; and a plurality of lighting modules mounted to the common axle each including a light beam emitter, wherein a first one of the plurality of lighting modules interfaces with the rotating interface to rotate about the lighting module horizontal rotation axis, allowing a first light beam emitter to be oriented according to a first degree of freedom, and wherein a second one of the plurality of lighting modules includes a wing module arm assembly including a wing module joint defining a lighting module vertical plane rotation axis, wherein the wing module arm assembly interfaces with the spinnable interface for a second light beam emitter to rotate about the lighting module horizontal rotation axis and wherein the wing module joint of the wing module arm assembly allows the second light beam emitter to rotate about the lighting module vertical plane rotation axis, thereby according to a second degree of freedom.

In some aspects, the techniques described herein relate to a spotlight, further including a projection extending from the mounting module and a sensor module mounted to the projection, wherein a connection between the projection and the sensor module defines a sensor module joint featuring a sensor module horizontal plane rotation axis to orientate the sensor module, thereby defining a third degree of freedom.

In some aspects, the techniques described herein relate to a spotlight, further including a projection extending from the mounting module on which is mounted a sensor module, wherein the projection is spinnable relative to the mounting module according to a sensor module vertical rotation axis, thereby allowing to orient the sensor module according to a fourth degree of freedom.

In some aspects, the techniques described herein relate to a spotlight including: a mounting module for mounting the spotlight to a support surface defining a first plane, the mounting module including an axle defining a first cylindrical interface designed for rotation therearound and a second interface; a first central lighting module adapted to rotate about the cylindrical interface; and a first wing lighting module adapted to pivot about the second interface.

In some aspects, the techniques described herein relate to a spotlight, further including a second central module adapted to rotate about the cylindrical interface, wherein the first central lighting module and the second central lighting module are adapted to be directable independently.

In some aspects, the techniques described herein relate to a spotlight, wherein the wing lighting module includes a joint and a light emitter, wherein the light emitter is directable according to two degrees of freedom therethrough.

In some aspects, the techniques described herein relate to a spotlight, wherein the axle further includes a third interface, and wherein the spotlight further includes a second wing lighting module adapted to pivot about the third interface, wherein the first wing module and the second wing module are adapted to be directable independently.

In some aspects, the techniques described herein relate to a spotlight, wherein the first wing lighting module and the second wing lighting module are each directable between a first position and a second position farther from the central lighting module than the first position on each side of the central lighting module, wherein spread angle between the wing lighting modules when the wing lighting modules are in the second positions is at least twenty (20) degrees greater than when the lighting modules are in the first positions.

In some aspects, the techniques described herein relate to a spotlight including: a mounting module for mounting the spotlight to a support surface about a mounting interface; an axle mounted to the mounting module distant from the mounting interface; a first lighting module rotatably mounted to the axle, a first lighting module including a first directable light emitter; and a second lighting module pivotably mounted to the axle, the second lighting module including a second directable light emitter.

In some aspects, the techniques described herein relate to a spotlight, wherein the axle includes an extremity, and the second lighting module is pivotably mounted to the extremity of the axle.

In some aspects, the techniques described herein relate to a spotlight, wherein the second lighting module includes a joint allowing to direct the second directable light emitter between a first position and a second position which directs the second directable light emitter farther from the mounting module.

In some aspects, the techniques described herein relate to a spotlight, further including a third lighting module rotatably mounted to the axle, wherein the third lighting module includes a third directable light emitter, and wherein the first lighting module and the third lighting modules are independently rotatable around the axle.

In some aspects, the techniques described herein relate to a spotlight, further including a fourth lighting module including a fourth directable light emitter, wherein the fourth lighting module is pivotably mounted to the axle.

In some aspects, the techniques described herein relate to a spotlight, further including a projection extending from the mounting module which is non-parallel to the axle, and a sensor module mounted to the projection.

In some aspects, the techniques described herein relate to a spotlight, wherein the projection further includes a joint allowing to direct the sensor module between a first position and a second position which is farther from the first light module.

In some aspects, the techniques described herein relate to a spotlight, wherein the first directable light emitter and the third directable light emitter are directable to an angle of at least twenty (20) degrees in-between.

In some aspects, the techniques described herein relate to a spotlight, wherein the axle has an axis, wherein the second directable light emitter and the fourth directable light emitter are directable to an angle of at least twenty (20) degrees in-between in a plane perpendicular to the axis of the axle.

In some aspects, the techniques described herein relate to a spotlight, wherein the second directable light emitter and the directable fourth light emitter are each directable between a first position and a second position on each side of the mounting module, wherein the second position is farther from the mounting module than the first position, and wherein an angle measured between directions of the second light module and the fourth light module in the second positions is at least twenty (20) degrees greater than in the first positions.

In some aspects, the techniques described herein relate to a spotlight, wherein the axle has a cylindrical interface, and wherein the first light module includes a ring portion mounted to the cylindrical interface.

In some aspects, the techniques described herein relate to a spotlight, wherein, when the spotlight is mounted to a vertical wall, the first light module is movable between a downward position in which the first directable light emitter is directed downward relative to a horizontal plane, and an upward position in which the first directable light emitter is directed upward relative to the horizontal plane.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
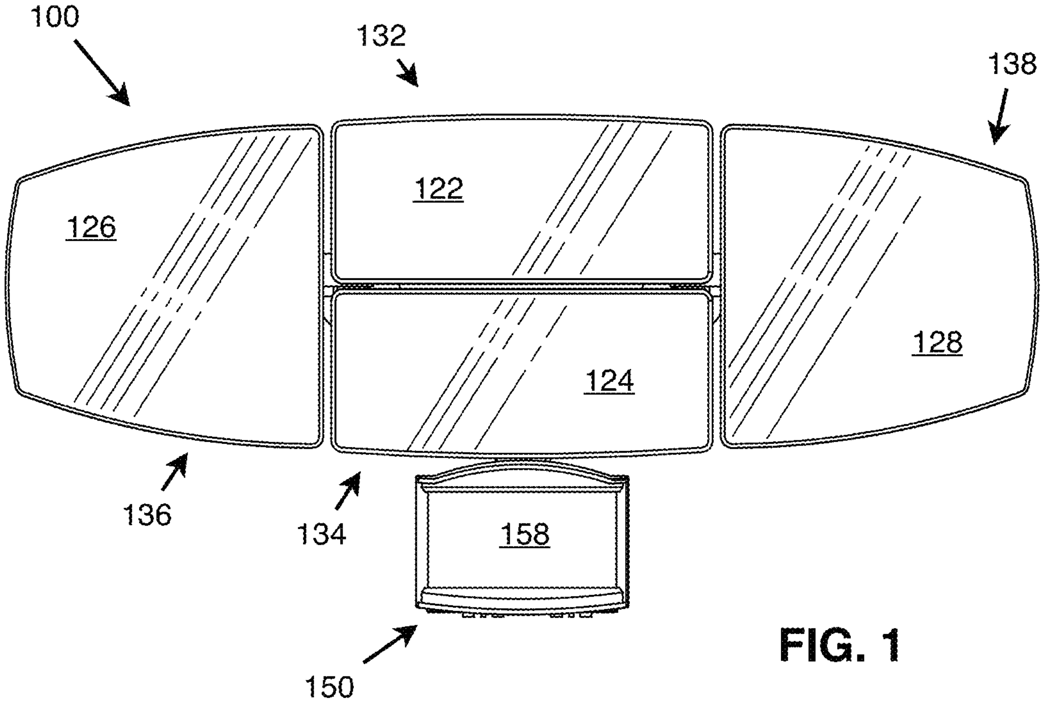
FIG. 1 is a front elevation view of a spotlight in accordance with an embodiment.
Figure 2:
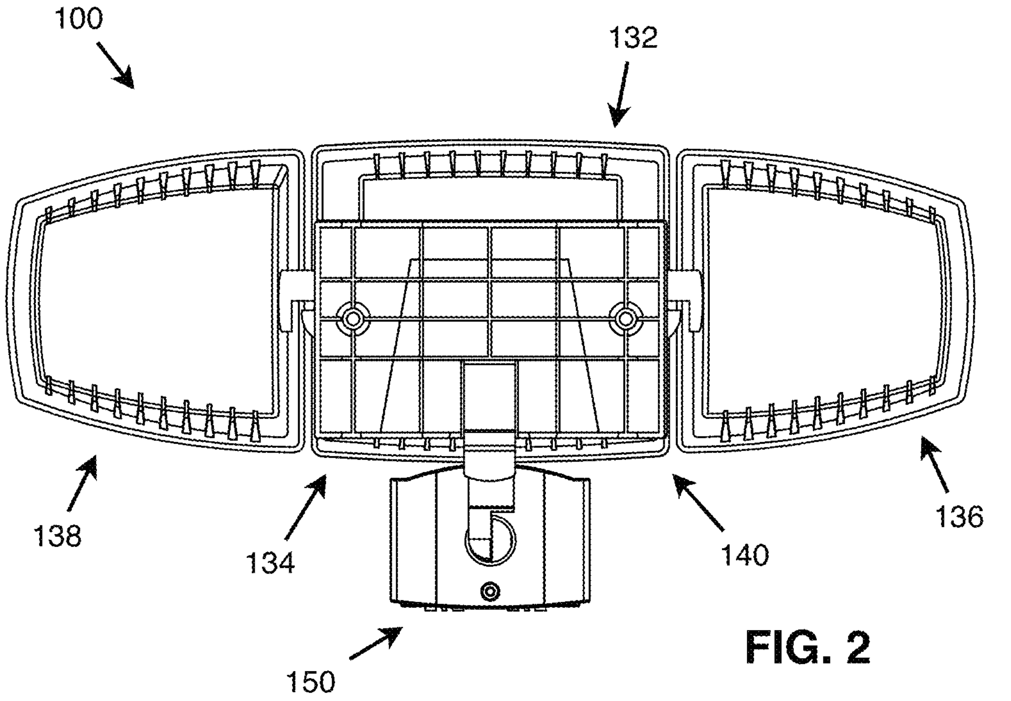
FIG. 2 is a rear elevation view of the spotlight of FIG. 1.

The realizations will now be described more fully hereinafter with reference to the accompanying figures, in which realizations are illustrated. The foregoing may, however, be embodied in many different forms and should not be construed as limited to the illustrated realizations set forth herein.

With respect to the present description, references to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term “or” should generally be understood to mean “and/or” and so forth.

Recitation of ranges of values and of values herein or on the drawings are not intended to be limiting, referring instead individually to any and all values falling within the range, unless otherwise indicated herein, and each separate value within such a range is incorporated into the specification as if it were individually recited herein. The words “about”, “approximately”, or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described realizations. The use of any and all examples, or exemplary language (“e.g.,” “such as”, or the like) provided herein, is intended merely to better illuminate the exemplary realizations and does not pose a limitation on the scope of the realizations. No language in the specification should be construed as indicating any unclaimed element as essential to the practice of the realizations. The use of the term “substantially” is intended to mean “for the most part” or “essentially” depending on the context. It is to be construed as indicating that some deviation from the word it qualifies is acceptable as would be appreciated by one of ordinary skill in the art to operate satisfactorily for the intended purpose.

In the following description, it is understood that terms such as "first", "second", "top", "bottom", "above", "below", and the like, are words of convenience and are not to be construed as limiting terms.

The terms "top", "up", "upper", "bottom", "lower", "down", "vertical", "horizontal", "interior" and "exterior" and the like are intended to be construed in their normal meaning in relation with normal installation of the product, with normal installation of the components being depicted on FIGS. 1 to 8.

It should further be noted that for purposes of this disclosure, the terms "coupled" and "connected" mean the joining of two members directly or indirectly to one another. Such joining may be stationary in nature or movable in nature and/or such joining may allow for the flow of electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent or alternatively removable or releasable.

Referring now to the drawings, and more particularly to FIGS. 1 to 8, a spotlight 100 is designed to be mounted to a stable surface such as a wall (not shown) through a mounting interface 141. The spotlight 100 comprises four (4) light beam emitters 122, 124, 126, 128 wherein at least some of the light beam emitters 122, 124, 126, 128 is orientable to controllably light up a surrounding area.

More precisely, according to a realization, the spotlight 100 comprises a series of lighting modules, also referred to herein as modules, comprising a top-central module 132 comprising a top-central light beam emitter 122, and a bottom-central module 134 comprising a bottom-central light beam emitter 124, a right wing module 136 comprising a right beam emitter 126, and a left wing module 138 comprising a left beam emitter 128.

The spotlight 100 further comprises a mounting module 140 adapted to mount the spotlight 100 to a support surface, typically a wall, and according to an embodiment connecting the spotlight 100 to an electric box present in the wall to power up the spotlight 100.

It is worth mentioning that definition of horizontal and vertical in the reminder of the description is based on such a vertical wall-mounting example. Thereby, the plane defined by the wall is the vertical, and a line perpendicular to the wall takes is part of the horizontal plane.

The spotlight 100 further comprises a sensor module 150, located below the mounting module 140, and adapted to house one or more sensors used to control the operation of the spotlight 100, for instance a light sensor adapted for detecting the surrounding light intensity, and/or a motion sensor 158 adapted to detect for instance people moving in the vicinity of the spotlight 100.

Figure 14:
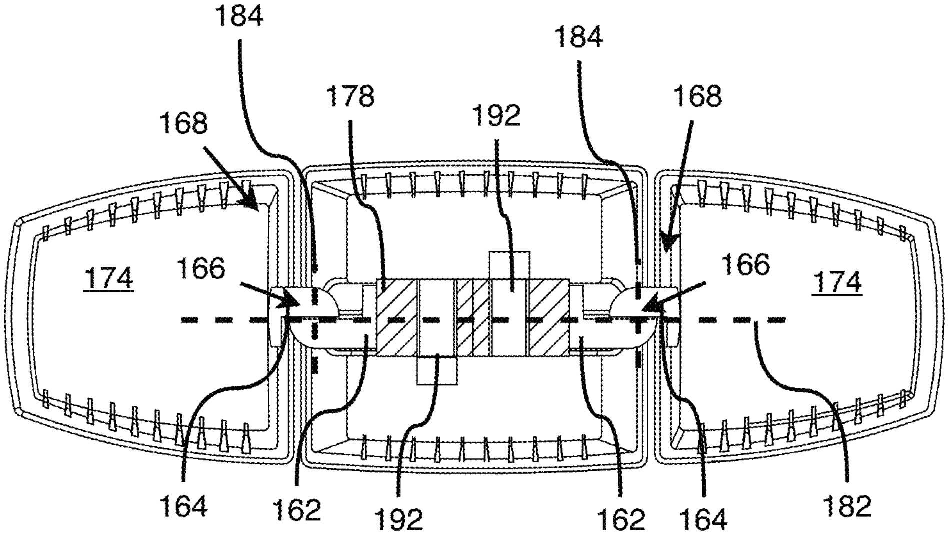
FIG. 14 is a rear elevation view of the spotlight of FIG. 1 with components removed to depict the orientation mechanism in accordance with an embodiment.

Referring additionally to FIG. 14, according to an aspect, there is described herein a spotlight 100 comprising a mounting module 140 for mounting the spotlight 100 to a support surface. The mounting module 140 comprises a common axle 178 distant from the support surface. The common axle 178 has a lighting module horizontal rotation axis 182 and a lighting module vertical plane rotation axis 184 which is reclinable in a vertical plane. The spotlight 100 further comprises a central lighting module (e.g., one of top-central module 132 and bottom-central module 134) rotatable about the lighting module horizontal rotation axis 182. The spotlight 100 further comprises a wing lighting module (e.g., one of right wing module 136 and left wing module 138) rotatable about the lighting module horizontal rotation axis 182 and reclinable about the lighting module vertical plane rotation axis 184.

Figure 3:
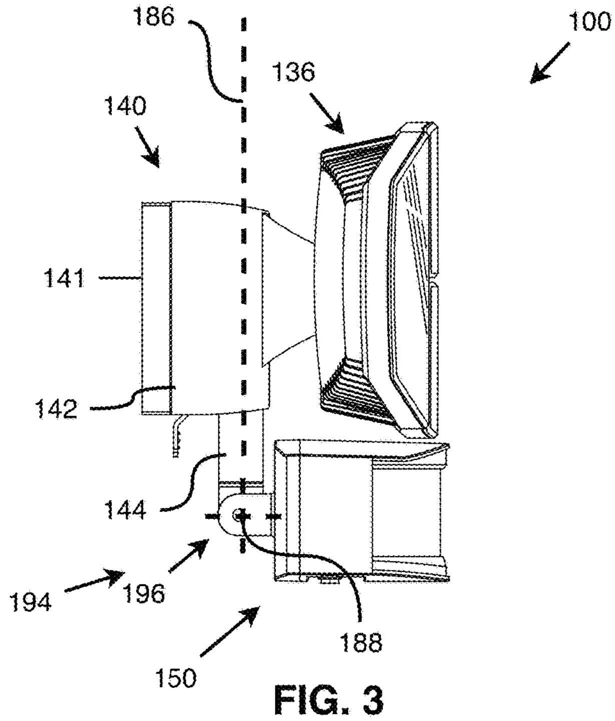
FIGS. 3 and 4 are respectively a left elevation view and a right elevation view of the spotlight of FIG. 1.
Figure 4:
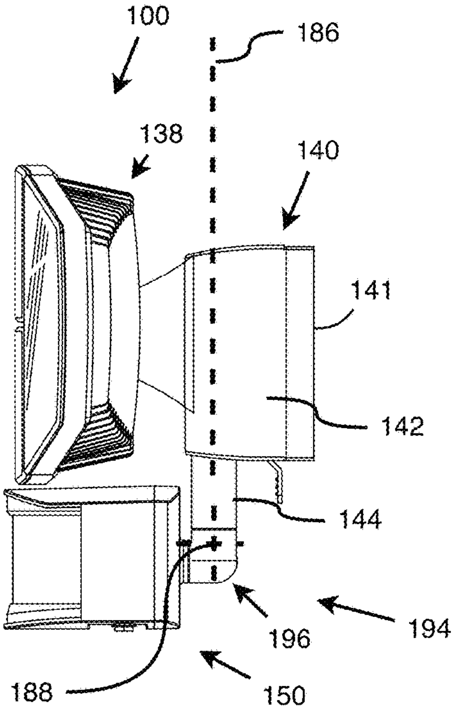
Figure 12:
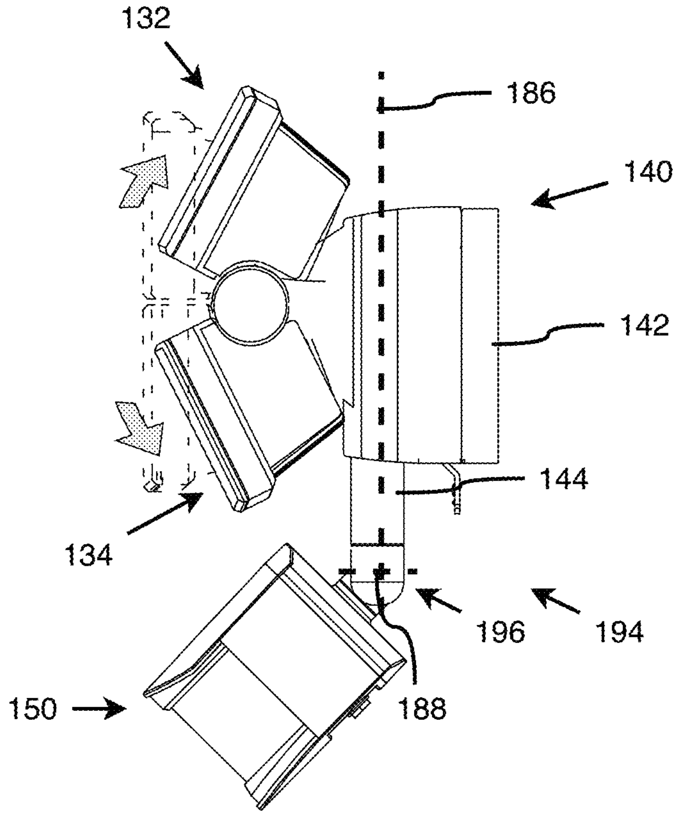
FIG. 12 is a side view of the spotlight of FIG. 1 with the side wings removed, with a depiction of a rotation of the top-central beam emitter and of the bottom-central beam emitter.

Referring particularly to FIGS. 3 and 4, and additionally to FIG. 12, the sensor module 150 is mounted to a projection 144 extending downward from the body 142 of the mounting module 140. The sensor module 150 is mounted to a sensor module horizontal plane rotation axis 188 about the extremity of the projection 144 allowing to set the orientation of the sensor module 150 relative to the horizontal. Accordingly, the connection of the projection 144 to the sensor module 150 defines a sensor module arm assembly 194 having a sensor module joint 196 and a sensor module horizontal plane rotation axis 188 around which the sensor module 150 can rotate.

According to an embodiment, setting the orientation of the sensor module 150 relative to the sensor module horizontal plane rotation axis 188 is possible by simply reorienting the sensor module 150 with the friction at the sensor module horizontal plane rotation axis 188 maintaining the orientation of the sensor module 150 once ceasing to undergo an external force.

According to an embodiment, setting the orientation of the sensor module 150 relative to the sensor module horizontal plane rotation axis 188 is performed by untightening a screw (for example) maintaining the position of the sensor module 150 relative to the projection 144 through e.g., interfacing teeth (for example), orienting the sensor module 150, and tightening the screw of the interface to set up the angle.

According to an embodiment, the projection 144 is adapted to spin relative to a sensor module vertical rotation axis 186, allowing to orient, or to rotate, leftward and/or rightward the sensor module 150. According to an embodiment, a tightening solution such as an axial screw screwable to the projection 144 or a radial screen to be screwed through the body 142 of the mounting module 140 and adapted to abut the projection 144 to set its orientation is used. It should be noted that spinning of the projection 144 about the sensor module vertical rotation axis 186 changes the orientation of the sensor module horizontal plane rotation axis 188 in a horizontal plane.

According to an embodiment, the top-central light beam emitter 122 and the bottom-central light beam emitter 124 are orientable individually, thus rotatable relative to a lighting module horizontal rotation axis 182 thus directing the light from the top-central light beam emitter 122 and the bottom-central light beam emitter 124 upward or downward. The top-central light beam emitter 122 and the bottom-central light beam emitter 124 are mounted to a common axle 178 around which the top-central light beam emitter 122 and the bottom-central light beam emitter 124 rotate thus that allows to orient the central light beams.

A similar tightening solution may be used, when necessary, to set the orientation of the top-central light beam emitter 122 and of the bottom-central light beam emitter 124.

Figure 5:
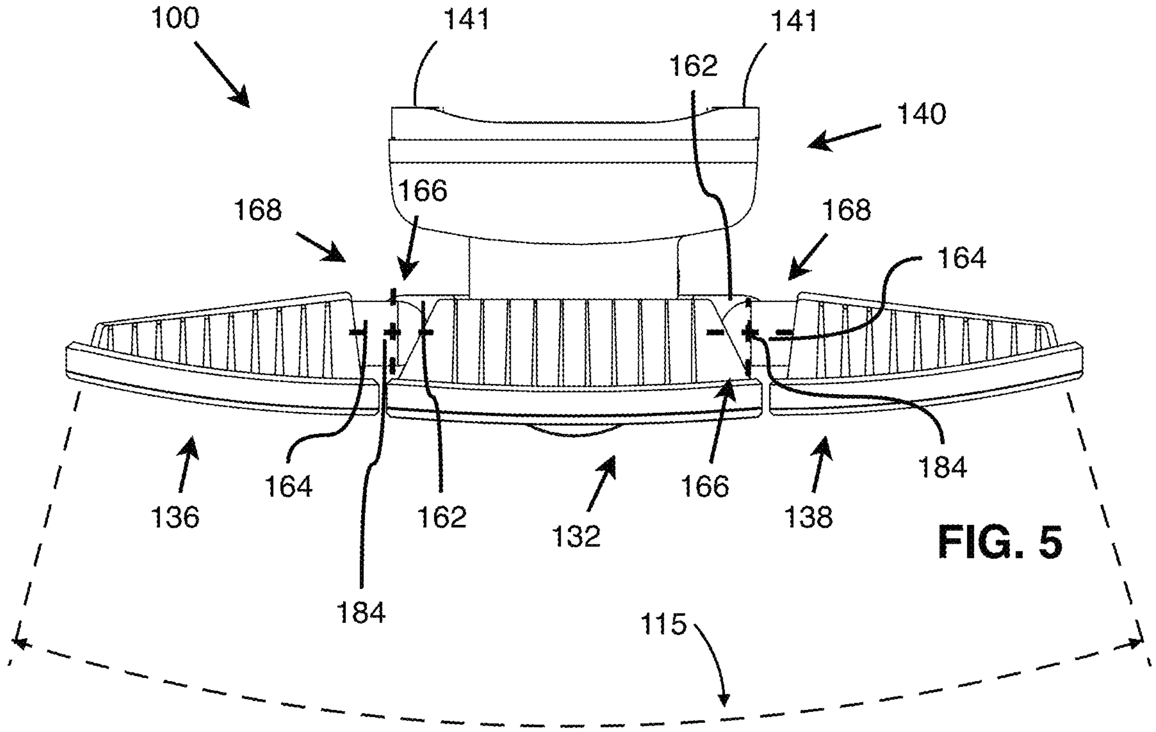
FIG. 5 is a top plan view of the spotlight of FIG. 1.
Figure 6:
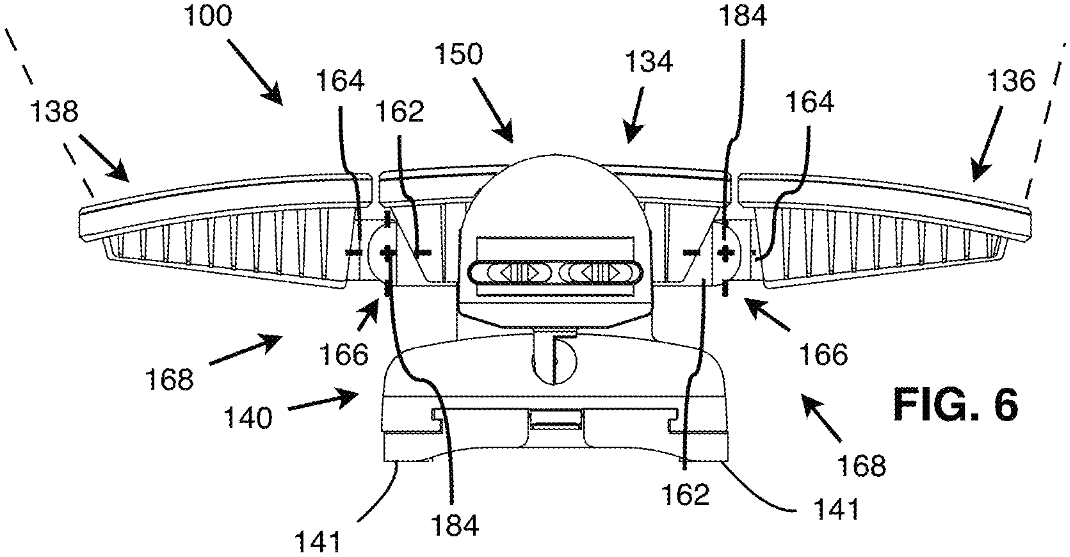
FIG. 6 is a bottom plan view of the spotlight of FIG. 1.
Figure 7:
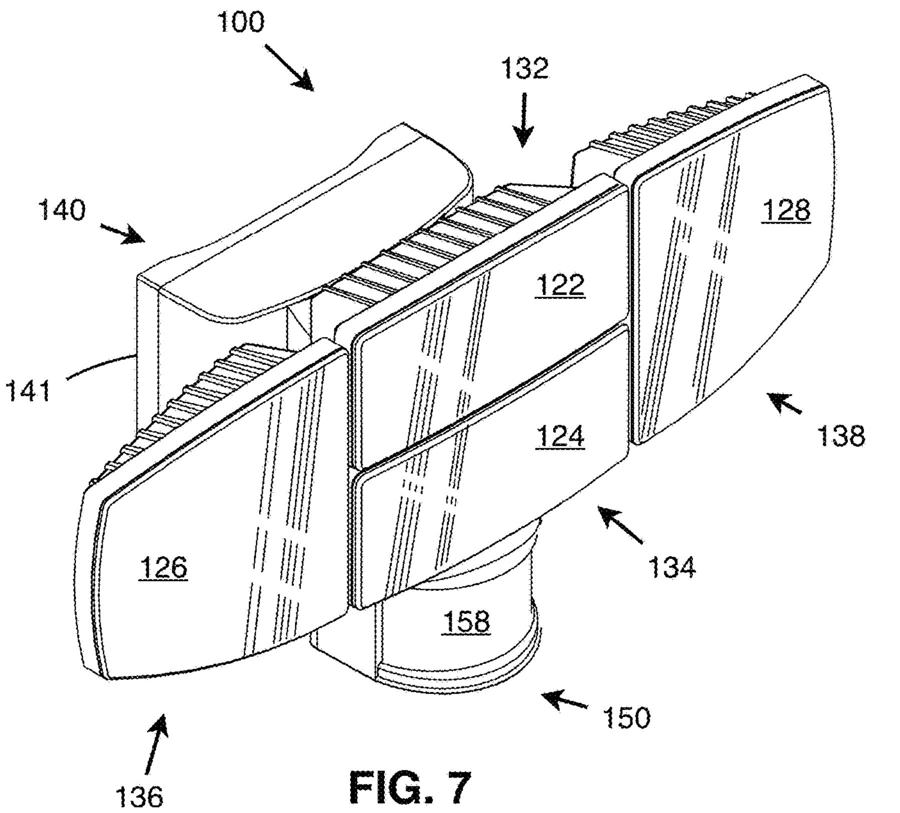
FIG. 7 is an oblique perspective view from 45 degrees from the left and 45 degrees of elevation of the spotlight of FIG. 1.
Figure 8:
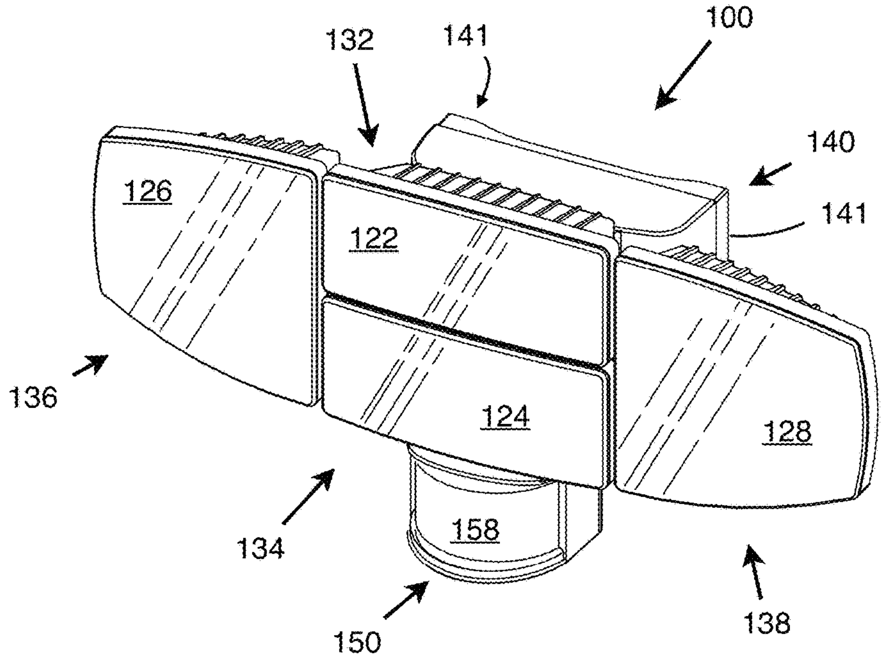
FIG. 8 is an oblique perspective view from 45 degrees from the right and 45 degrees of elevation of the spotlight of FIG. 1.
Figure 11:
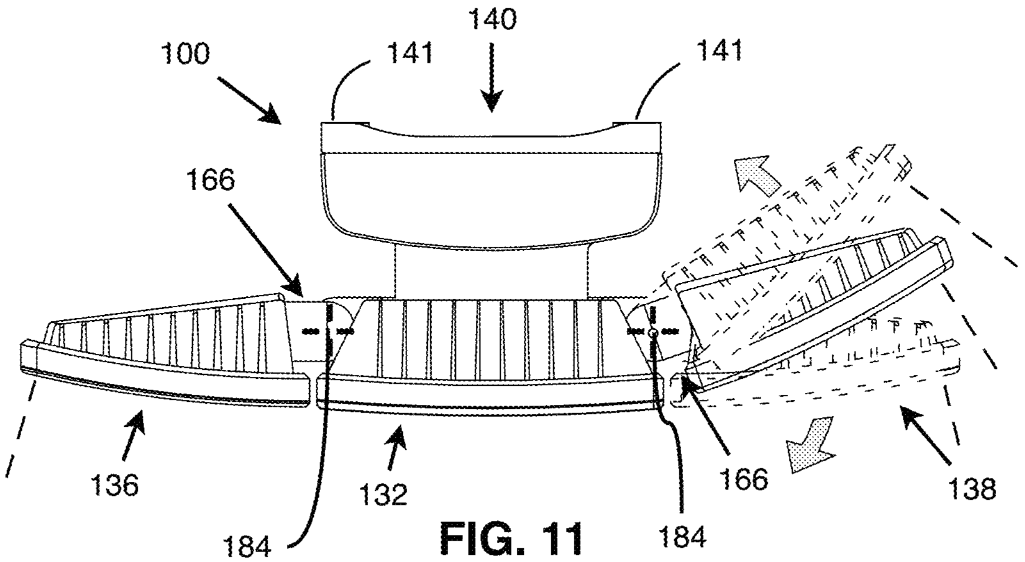
FIG. 11 is a top plan view of the spotlight of FIG. 1 with a depiction of a rotation of the left wing module.
Figure 13:
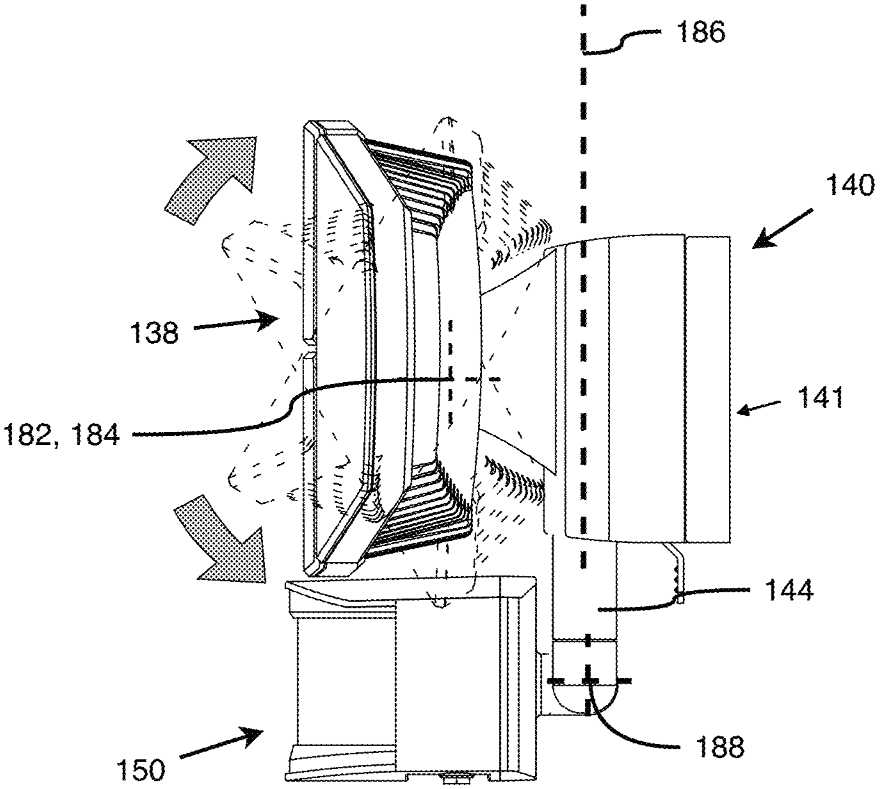
FIG. 13 is a side view of the spotlight of FIG. 1 with a depiction of a rotation of the left wing module.

Referring particularly to FIGS. 5 and 6 and additionally to FIGS. 11, 13 and 14, according to an embodiment, the central module 132 is rigidly mounted to the mounting module 140. The rightwing module 136 and the left wing module 138 are mounted to the mounting module 140 through the common axle 178, defining wings to the central modules 132, 134. The right wing module 136 and the left wing module 138 are mounted in a similar fashion.

A wing module arm assembly 168, comprising an arm 162, extends from the side of the central module 132 (via the common axle 178), behind the top-central light beam emitter 122 and the bottom-central light beam emitter 124. A complementary arm 164, extends from the wing modules 136, 138, is joined as a wing module joint 166 having a lighting module vertical plane rotation axis 184, allowing to modify the orientation of the light beam emitted by the light beam emitter 126, 128, thereby setting the width of the area lit up by the spotlight 100.

According to an embodiment, the orientation settings of the right wing module 136 and the left wing module 138 are maintained though friction, or using a tightening solution such a screw or nut and bolt combination (not shown).

According to an embodiment depicted in FIG. 13, the arm 162 is adapted to spin relative to the central module 132 according to a lighting module horizontal rotation axis 182 within a range of angles, e.g., between minus 45 degrees and plus 45 degrees relative to the horizontal. It should be noted that the spinning of the arm 162 about the lighting module horizontal rotation axis 182, changes the inclination of the lighting module vertical plane rotation axis 184 in a vertical plane; i.e., the lighting module vertical plane rotation axis 184 is reclinable in a vertical plane.

According to an alternative embodiment (not shown), the arm 162 is fixedly mounted to the mounting module 140, and the complementary arm 164 and the corresponding wing module 136, 138 are rotatable relative to each other.

According to a preferred embodiment, the wires (not shown) providing the electrical connections between the modules 140, 132, 134, 136 and 138 extend within the modules and the within the module linking components (e.g., common axle 178 and wing module arm assemblies 168). Accordingly, the wiring is protected from weather. Nature and characteristics of the wiring is further selected for the wiring to be able to undergo orientation of the central modules 132, 134 and of the wing modules 136, 138 without such orientation setting pinching the wiring, tightening the wiring over a preset tension, etc. Similar characteristics and features applies to the wiring of the sensor module 150.

Referring particularly to FIGS. 12 and 14, according to an embodiment the common axle 178 defines a lighting module horizontal rotation axis 182. The common axle 178 is mounted at the front of the mounting module 140. The common axle 178 features a cylindrical face on which are mounted cylindrical (e.g., unibody) jaws 192 having a ring portion that features at least a section a ring-shaped face, extending from the top-central module 132 and the bottom central module 134 providing rotating interfaces allowing to independently orient the top-central module 132 and the bottom central module 134. The common axle 178 extend sideways to connect spinnable arms 162 on which are pivotably mounted the complementary arm 164. The connection of the common axle 178 to the arm 162 provides a spinnable interface allowing to rotate the wing modules 136, 138 relative to the lighting module horizontal rotation axis 182. The arm 162 and the complementary arm 164 defines together a wing module arm assembly 168 comprising a wing module joint 166 having a lighting module vertical plane rotation axis 184 around which the wing light beam emitters 126, 128 rotate.

Therefore, this configuration allows independent orientation of the wing light beam emitters 126, 128 toward and/or away from the central modules 132, 134, (i.e., about lighting module vertical plane rotation axis 184) and upward and downward (i.e., about lighting module horizontal rotation axis 182).

This common structure provides an effective solution to allow orienting the each one of the modules 132, 134, 136 and 138 to up to two (2) degrees of freedom (i.e., modules 132 and 134 having a single (1) degree of freedom, namely the first degree of freedom, and modules 136 and 138 having two (2) degrees of freedom, namely a first degree of freedom and a second degree of freedom, different and distinct from each other) and to provide a simple common structure connecting all modules 132, 134, 136 and 138 to the mounting module 140 using a simple and efficient wiring scheme.

According to an embodiment, the sensor module 150 is orientable according to two independent degrees of freedom (i.e., a third and a fourth degree of freedom, also different and distinct from each other and from the first and second degrees of freedom), about the sensor module vertical rotation axis 186 and the sensor module horizontal plane rotation axis 188 through the sensor module arm assembly 194 comprising the sensor module joint 196.

According to a preferred embodiment, the lighting module vertical plane rotation axis 184 is perpendicular to the lighting module horizontal rotation axis 182.

Figure 9:
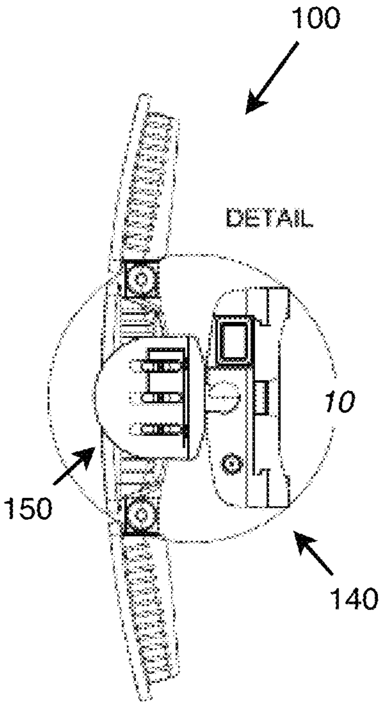
FIG. 9 is a bottom plan view of a portion of the spotlight of FIG. 1.
Figure 10:
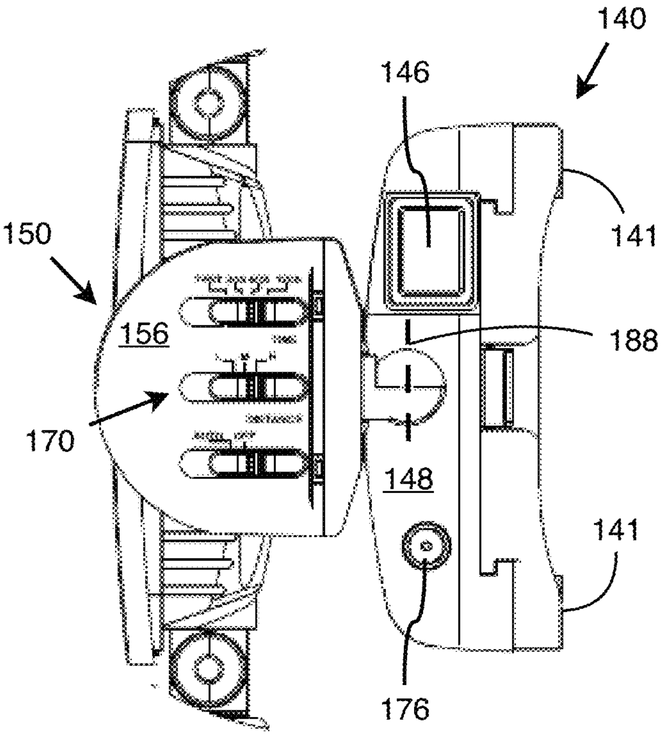
FIG. 10 is detailed bottom plan view of area 10 of the spotlight of FIG. 1 identified on FIG. 9.

Referring particularly to FIGS. 9 and 10, according to an embodiment the sensor module 150 comprises controls 170 over its bottom face 156. Options for such controls 170 comprises multi-positions switches that may be used to set, e.g., lighting intensity, lighting triggering sensibility, motion detector sensibility in terms of distance or level of motions, and an On/Off/Automatic setting switch.

According to an embodiment, a light detector 146 is mounted to the bottom face 148 of the mounting module 140.

According to an embodiment, the mounting module 140 of the spotlight 100 is adapted to house a battery cell (not shown). The mounting module 140 comprises a socket 176 adapted to connect a solar panel thereto that is adapted to charge the battery cell thereby avoiding the need for connecting the spotlight 100 to an electric box present in the wall.

Not depicted. According to an embodiment, the spotlight 100 is a solar spot light comprising a solar panel and free of wiring allowing to connect the spotlight to the grid.

Referring particularly to FIGS. 1 and 14, according to a preferred embodiment, the light beam emitters 122, 124, 126 and 128 comprises arrays of LEDs (not shown) covered with a diffusing lens 174 protecting the LEDs from weather conditions while being configured for generating a more uniform light beam.

According to a preferred embodiment, the top-central module 132 is directable upward to an angle of at least ten (10) degrees, at least fifteen (15) degrees, at least twenty (20) degrees, at least twenty-five (25) degrees, at least thirty (30) degrees from the horizontal. (For greater clarity: these are degrees of angle and not the same as the degrees of freedom discussed above and the "at least" language should not be interpreted to encompass angles over 180 degrees.) The bottom-central module 134 is directable downward to an angle of at least ten (10) degrees, or at least fifteen (15) degrees, or at least twenty (20) degrees, or at least twenty-five (25) degrees, or at least thirty (30) degrees from the horizontal (max 90 degrees). The limit downward angle of the top-central module 132 is limited by the top-central module 132 abutting the bottom-central module 134. The limit upward angle of the bottom-central module 134 is limited by the bottom-central module 134 abutting the top-central module 134.

The vertical range of orientation of the wing modules 136, 138 is between at least ten (10) degrees, or at least fifteen (15) degrees, or at least twenty (20) degrees, or at least twenty-five (25) degrees, or at least thirty (30) degrees, or at least thirty-five (35) degrees, or at least forty (40) degrees, or at least forty-five (45) degrees upward and downward from the horizontal, in other words a rotation range relative to the horizontal of at least (20) degrees, at least thirty (30) degrees, at least forty (40) degrees, at least fifty (50) degrees, at least sixty (60) degrees, at least seventy (70) degrees, at least eighty (80) degrees, up to at least ninety (90) degrees around the horizontal plane, with the spread angle 115, example depicted on FIG. 5, of the light emitted therefrom being able to adjust, aka. increase/decrease of at least (20) degrees, or at least thirty (30) degrees, or at least forty (40) degrees, or at least fifty (50) degrees, or at least sixty (60) degrees, or at least seventy (70) degrees, or at least eighty (80) degrees, or up to at least ninety (90) degrees.

The horizontal range of orientation the wing modules 136, 138 is of at least ten (10) degrees, or at least fifteen (15) degrees, or at least twenty (20) degrees, or at least twenty-five (25) degrees, or at least thirty (30) degrees, or at least thirty-five (35) degrees, or at least forty (40) degrees, or at least forty-five (45) sideward from an orientation substantially parallel to the orientation of the central modules 132, 134. Together, the field of view covered by the modules 132, 134, 136, 138 is up to at least (20) degrees, or at least thirty (30) degrees, or at least forty (40) degrees, or at least fifty (50) degrees, or at least sixty (60) degrees, or at least seventy (70) degrees, or at least eighty (80) degrees, or up to at least ninety (90) degrees around a vertical plane perpendicular to the wall and aligned with the vertical rotation axis 186.

The vertical range of the sensor module 150 is up to at least ten (10) degrees, or at least fifteen (15) degrees, or at least twenty (20) degrees, or at least twenty-five (25) degrees, or at least thirty (30) degrees, or at least thirty-five (35) degrees, or at least forty (40) degrees, or at least forty-five (45) degrees downward from the horizontal.

The horizontal range of orientation the sensor module 150 is of at least ten (10) degrees, or at least fifteen (15) degrees, or at least twenty (20) degrees, or at least twenty-five (25) degrees, or at least thirty (30) degrees, or at least thirty-five (35) degrees, or at least forty (40) degrees, or at least forty-five (45) sideward from an orientation substantially parallel to the orientation of the central modules 132, 134.

According to an embodiment, a method of installation of the spotlight 100 comprises to mount the mounting module 140 to the wall.

According to embodiment, mounting the mounting module 140 to the wall may comprises plugging the mounting module 140 to an electric box present in the wall, and/or to mount a solar panel at a location receiving sunlight and connecting the solar panel to the mounting module 140.

The method of installation further comprises set the Mode of Operation control of the spotlight 100 to On, to orient the modules 132, 134, 136, 138 for the light beams to cover the desired area, and to orient the sensor module 150 to sense a desired area. The method comprises to set the other controls to the desired settings. The method finally comprises to set the Mode of Operation control to Automatic.

Orienting the modules 132, 134, 136, 138 and/or the sensor module 150 may comprises to untighten connections, to orient the module and to re-tighten the connection afterwards at the desired orientation, in some embodiment stiffening at the same time the connection.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A spotlight comprising:

a mounting module configured to be mounted to a support surface, the mounting module comprising an axle having an axle axis, the axle being distant from the support surface; and a plurality of lighting modules individually orientable, each comprising a light beam emitter, wherein a first one of the plurality of lighting modules is mounted to the axle and is rotatable around the axle axis, whereby the first lighting module being orientable according to only one degree of freedom, and wherein a second one of the plurality of lighting modules is mounted to a joint having a joint axis non-parallel to the axle axis with the second lighting module being rotatable around the joint axis, and the joint is pivotally mounted to the axle with the joint being spinnable on the axle axis, whereby the second lighting module being orientable according to two degrees of freedom.

2. The spotlight of claim 1, further comprising a projection extending from the mounting module and a sensor module mounted to the projection, wherein a connection between the projection and the sensor module defines a sensor module joint featuring a sensor module horizontal plane rotation axis to orientate the sensor module.

3. The spotlight of claim 1, further comprising a projection extending from the mounting module on which is mounted a sensor module, wherein the projection is spinnable relative to the mounting module according to a sensor module vertical rotation axis.

4. A spotlight comprising:

a mounting module for mounting the spotlight to a support surface defining a first plane, the mounting module comprising an axle having an axle axis, the axle having a cylindrical first interface designed for rotation therearound, and a non-cylindrical second interface;

a first central lighting module mounted to the axle, the first central lighting module being adapted to rotate about the cylindrical first interface around the axle axis, whereby the first central lighting module being orientable according to only one degree of freedom; and a first wing lighting module adapted to pivot on and rotate about the axle axis on the non-cylindrical second interface, whereby the first wing lighting module being orientable according to two degrees of freedom.

5. The spotlight of claim 4, further comprising a second central lighting module adapted to rotate about the cylindrical first interface, wherein the first central lighting module and the second central lighting module are adapted to be directable independently.

6. The spotlight of claim 4, wherein the first wing lighting module comprises a joint and a light emitter, wherein the light emitter is directable according to two degrees of freedom therethrough.

7. The spotlight of claim 4, wherein the axle further comprises a non-cylindrical third interface, and wherein the spotlight further comprises a second wing lighting module adapted to pivot on the axle axis of the non-cylindrical third interface, wherein the first wing lighting module and the second wing lighting module are adapted to be directable independently.

8. The spotlight of claim 7, wherein the first wing lighting module and the second wing lighting module are each directable between a first position and a second position farther from the first central lighting module than the first position on each side of the first central lighting module, wherein spread angle between the first wing lighting module and the second wing lighting modules when the first wing lighting module and the second wing lighting module are in the second positions is at least twenty (20) degrees greater than when the first wing lighting module and the second wing lighting module are in the first positions.

9. A spotlight comprising:

a mounting module for mounting the spotlight to a support surface about a mounting interface;

an axle having an axle axis, the axle being mounted to the mounting module distant from the mounting interface;

a first lighting module mounted to the axle, the first lighting module being rotatable around the axle axis according to only one degree of freedom, the first lighting module comprising a directable first light emitter; and a second lighting module mounted to the axle, the second lighting module being pivotable on and rotatable around the axle axis according to two degrees of freedom, the second lighting module comprising a directable second light emitter.

10. The spotlight of claim 9, wherein the axle comprises an extremity, and the second lighting module is pivotably mounted to the extremity of the axle.

11. The spotlight of claim 9, wherein the second lighting module comprises a joint allowing to direct the directable second light emitter between a first position and a second position which directs the directable second light emitter farther from the mounting module.

12. The spotlight of claim 9, further comprising a third lighting module rotatably mounted to the axle, wherein the third lighting module comprises a directable third light emitter, and wherein the first lighting module and the third lighting modules are independently rotatable around the axle.

13. The spotlight of claim 10, further comprising a fourth lighting module comprising a directable fourth light emitter, wherein the fourth lighting module is pivotably mounted to the axle.

14. The spotlight of claim 9, further comprising a projection extending from the mounting module having an axis that is non-parallel to the axle axis, and a sensor module mounted to the projection.

15. The spotlight of claim 14, wherein the projection further comprises a joint allowing to direct the sensor module between a first position and a second position which is farther from the first light module.

16. The spotlight of claim 12, wherein the directable first light emitter and the directable third light emitter are directable to an angle of at least twenty (20) degrees in-between.

17. The spotlight of claim 13, wherein the directable second light emitter and the directable fourth light emitter are directable to an angle of at least twenty (20) degrees in-between in a plane perpendicular to the axle axis.

18. The spotlight of claim 13, wherein the directable second light emitter and the directable fourth light emitter are each directable between a first position and a second position on each side of the mounting module, wherein the second position is farther from the mounting module than the first position, and wherein an angle measured between directions of the second light module and the fourth light module in the second positions is at least twenty (20) degrees greater than in the first positions.

19. The spotlight of claim 9, wherein the axle has a cylindrical interface, and wherein the first lighting module comprises a ring portion mounted to the cylindrical interface.

20. The spotlight of claim 9, wherein, when the spotlight is mounted to a vertical wall, with the first lighting module being movable between a downward position in which the directable first light emitter is directed downward relative to a horizontal plane, and an upward position in which the directable first light emitter is directed upward relative to the horizontal plane.

* * * * *